United States Patent [19]

Nelson et al.

[11] 4,251,355
[45] Feb. 17, 1981

[54] APPARATUS FOR SEPARATING SNAKESKINS AND FINES FROM POLYMERIC PELLETS

[75] Inventors: Ronald C. Nelson, Chesterfield; Robert O. Williams, Manchester, both of Mo.

[73] Assignee: Monsanto Company, St. Louis, Mo.

[21] Appl. No.: 72,953

[22] Filed: Sep. 6, 1979

[51] Int. Cl.³ ............................. B07B 1/08; B07B 1/55
[52] U.S. Cl. ..................................... 209/241; 209/250; 209/260; 209/350; 209/380
[58] Field of Search ............... 209/240, 250, 260, 262, 209/271, 279, 280, 309, 350, 351, 361, 380, 241, 257

[56] References Cited

U.S. PATENT DOCUMENTS

| 2,834,060 | 5/1958 | Burns | 209/361 X |
| 3,104,069 | 9/1963 | Ferguson | 209/351 X |
| 3,123,551 | 3/1964 | Walker | 209/351 X |
| 3,428,173 | 2/1969 | Heuser | 209/350 X |

Primary Examiner—William A. Cuchlinski, Jr.
Attorney, Agent, or Firm—Robert L. Broad, Jr.

[57] ABSTRACT

Apparatus for separating snakeskins and fines from pellets in a collection of polymeric material wherein a first nozzle impinges the collection of polymeric material in a stream of air on a moving screen having a mesh size such that the screen will allow the air and fines to pass but will retain the pellets and snakeskins, the air stream carrying the fines through the screen into a closed compartment. A second nozzle is positioned to allow air from the closed compartment to move upwardly through the screen at a different location from the first nozzle to lift and remove snakeskins from the screen.

10 Claims, 2 Drawing Figures

APPARATUS FOR SEPARATING SNAKESKINS AND FINES FROM POLYMERIC PELLETS

BACKGROUND OF THE INVENTION

1. Field of the Invention

This invention relates to apparatus for removing fines and snakeskins from pellets in a collection of polymeric material.

2. Description of the Prior Art

It is known to use certain apparatus for removing fines or dust from a collection of polymeric material. Other apparatus is known which is suitable for removing angel hair or snakeskins from collections of polymeric material. The apparatus of this invention effectively separates both fines and snakeskins from pellets in a collection of polymeric material.

SUMMARY OF THE INVENTION

Apparatus for separating snakeskins and fines from pellets in a collection of polymeric material wherein a first nozzle impinges the polymeric material in an airstream on a moving screen at a first location, the screen having a mesh size such that fines and conveying air will pass through the screen while pellets and snakeskins will be retained on the screen. The airstream passing through the screen enters a closed compartment and exits from the compartment in an upwardly direction through a second nozzle positioned at a second location to lift snakeskins off the screen and remove them from the pellets.

DETAILED DESCRIPTION OF THE INVENTION

Figure 1:
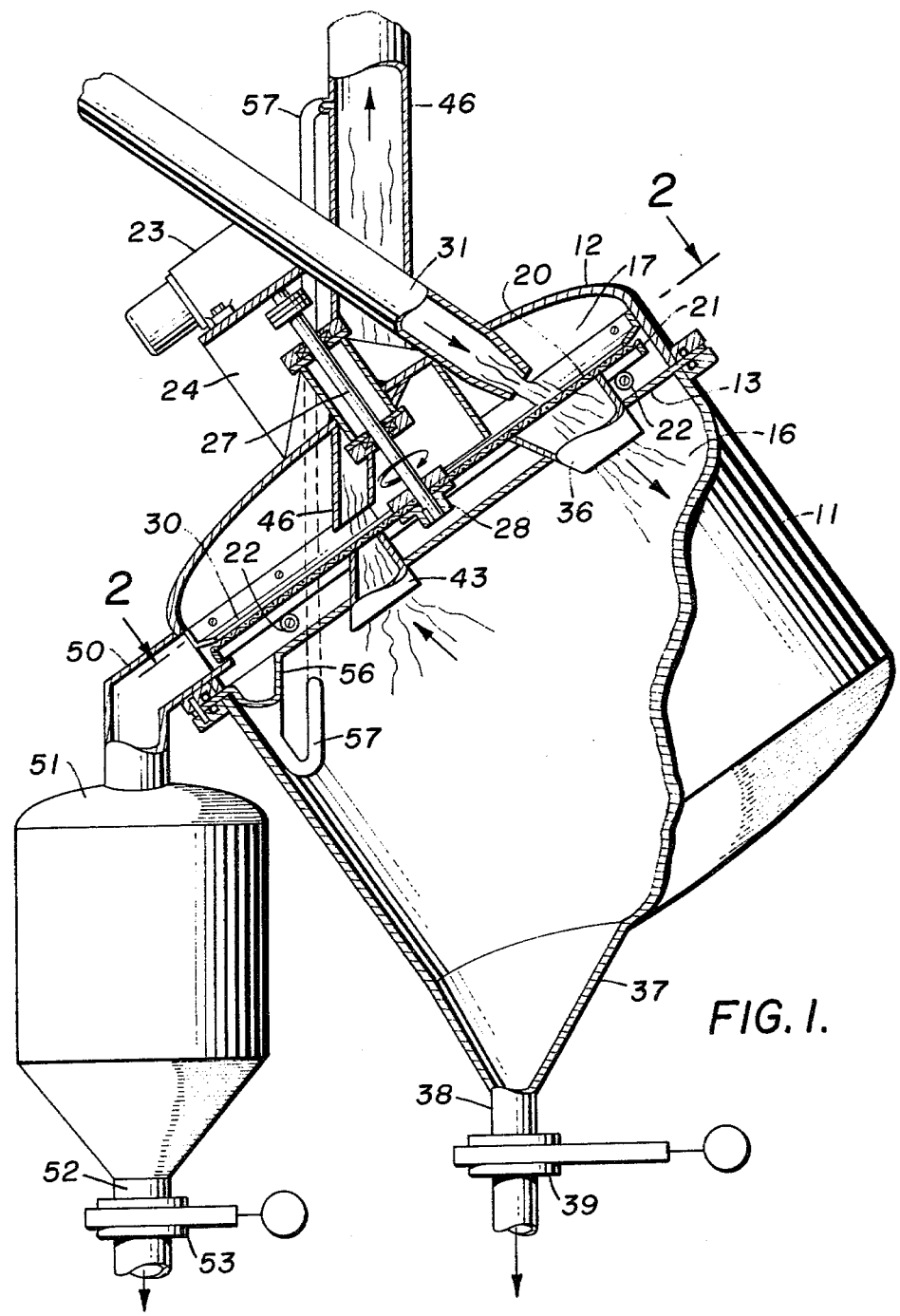
FIG. 1 is a cross-sectional view showing the positioning of the various parts of the apparatus making up the invention.

In the manufacture of fibers and other products from polymeric materials, these polymeric materials frequently exist at some point in the manufacturing process in the form of beads or pellets. For example, in making polyester or nylon fibers a polyester or nylon polymer is melt spun to form large strands or rods which are cooled and cut into pellets. The pellets are conveyed by a pneumatic conveying system from the cutting station to another station for further processing. In order to prevent settling and maintain movement of the pellets in the conveying system, it is necessary to move the pellets through conduits or tubes in a stream of air traveling at a relatively high velocity. When a pellet traveling at this velocity contacts the wall of the tube, frictional heat will melt a portion off the pellet and leave a tissue-thin strip of polymeric material attached to the inner surface of the tube. This thin layer of polymeric material adhering to the surface of the tube will eventually break loose from the tube, travel with the pellets, and contaminate the process downstream. These thin strips of polymeric material which are deposited on the walls of the tube by the moving pellets are referred to as "snakeskins" or "angel hair".

It is desirable to remove these snakeskins from the polymeric pellets in order to obtain a uniform final product. Also, the cutting and conveying of the pellets forms a certain amount of dust or fines which also should be removed from the pellets prior to melting the pellets to form the final product.

Referring now in detail to the drawing, there is shown an enclosure 11 having secured thereto a dished cover 12 to form a sealed or closed separation chamber, the enclosure 11 and the cover 12 having a circular cross-section. A plate 13 secured between the enclosure 11 and the cover 12 serves to divide the chamber into a lower compartment 16 and an upper compartment 17.

A circular mesh screen 20 is mounted for rotation above the plate 13, the screen being attached to a rim 21 which rests on bearings 22 secured to the cover 12. The screen is driven by a gear motor 23 mounted on a bracket 24 attached to the cover 12 and acting through a drive shaft 27, the screen 20 being attached to the drive shaft 27 by means of a hub 28. The screen 20 has a mesh size such that air carrying dust and fines will pass through the screen while polymer pellets and snakeskins will be retained on the upper surface of the screen. A flange 30 secured to the cover 12 extends outward from the cover 12 to overlap the edges of the screen 20 and thereby prevent any pellets from passing between the cover 12 and the edge of the screen 20.

A first nozzle 31 extends through the cover 12 and terminates above the screen 20 in the position illustrated in the drawings. The first nozzle is positioned at an angle to the screen to impinge the polymeric collection, made up of polymeric pellets, fines and snakeskins, onto the surface of the screen 20 in a stream of air. A frustoconical converging duct 36 mounted in an opening in the plate or wall 13 in alignment with the nozzle 31 directs the airstream carrying any fines into the enclosure 11.

The relatively large cross-sectional area of the enclosure 11 causes the velocity of the airstream to drop considerably in the enclosure 11, thereby causing the fines to fall out of the airstream to be withdrawn from the enclosure through a tapered conduit 37 connected to a pipe 38 which carries away collected fines. A gate valve 39 mounted in the pipe 38 is opened intermittently for intermittent removal of the fines. The nozzle 31 is reduced in diameter by about ⅓ through a gradually converging conical section at its exit end in order to accelerate the air passing through converging duct 36 and maximize the static pressure developed inside the enclosure 11. This, in turn, maximizes the velocity of the air passing through the moving screen from the nozzle 43. The relatively sudden air velocity increase in the converging exit end of the nozzle 31 produces an insignificant acceleration of the polymer pellets due to the short time exposure to the faster moving air. It is desirable to prevent the velocity of the polymeric pellets impinging on the moving screen from exceeding normal pneumatic conveying velocities in order to prevent damage to the pellets and excessive wear or erosion of the screen mesh.

The converging shape of duct 36 serves to collect the gradually diverging pattern of high velocity air exiting from the nozzle 31 and funnels all or most of this air into the enclosure 11 with little or no air backflowing through the duct 36. The converging duct 36 thus serves to prevent backflow as the velocity pressure of the conveying airstream changes into static pressure inside the enclosure 11.

Figure 2:
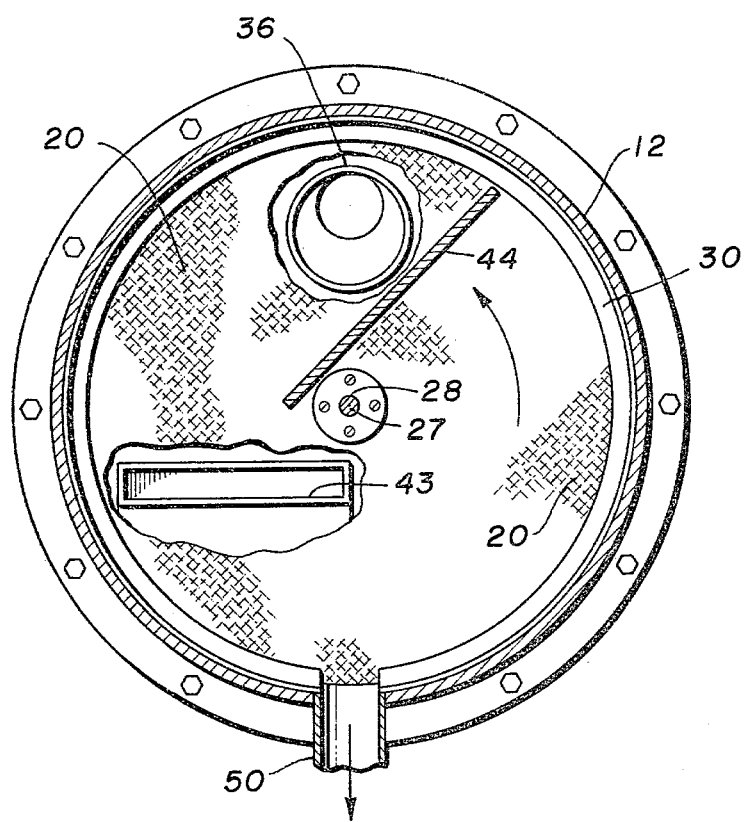
FIG. 2 is a cross-sectional view taken on line 2—2 of FIG. 1 showing the positioning of the nozzles relative to the circular screen.

A tapered second nozzle 43 mounted in an opening in the plate 13 and having a rectangular cross-sectional configuration is positioned for directing air from the enclosure 11 upwardly through the screen 20 to lift off and remove snakeskins and any fines remaining with the polymer pellets. FIG. 2 best shows the configuration and positioning of the nozzle 43, portions of the screen being broken away in this view to show the nozzle 43 and the converging duct 36.

Referring to FIG. 2, the collection of polymeric material is impinged on the screen 20 above the converging duct 36. It is necessary to have that portion of the polymeric collection which does not pass through the screen at the converging duct 36 to be carried past the nozzle 43. This is achieved by rotating the screen 20 in a counterclockwise direction as indicated in FIG. 2 and by providing a baffle 44 which is secured to the cover 12 and extends to a position sufficiently close to the screen 20 that pellets will not pass between the screen and the lowermost edge of the baffle 44. The positioning of the baffle 44 prevents movement of the pellets in a direction countercurrent to screen movement to cause the pellets to pass through the stream of air from the nozzle 43.

To insure movement of the pellets toward a collection point, to be described hereinafter, the apparatus is inclined at an angle of about 35° to horizontal, as best illustrated in FIG. 1. The moving pellets impinge on the screen 20 and bounce, roll and are carried by the rotating screen downward to the collection point at the lower edge of the inclined screen.

As best illustrated in FIG. 2, the second nozzle 43 extends from a position below the hub 28, i.e. between the hub and the lower edge of the screen, almost to the edge of the screen 20 to insure that all of the polymeric material remaining on the screen is exposed to the upwardly directed stream of air from the nozzle 43. The stream of air moving upwardly through the second nozzle 43 has a velocity sufficient to lift off and remove snakeskins and angel hair, these being withdrawn from the apparatus through a discharge duct 46. This moving stream of air also removes any fines or dust remaining with the polymeric pellets. Undersized pellets will also be removed from the screen 20 at this point and withdrawn through the duct 46.

The upper end of the discharge duct 46 is enlarged in cross-sectional area to reduce air velocity at this point such that any full size pellets which are picked up by the stream of air exiting from the second nozzle 43 will drop downward through the discharge duct 46 back onto the screen 20.

The clean pellets, with fines and snakeskins removed, reach the lowermost edge of the inclined screen 20 and fall off this edge into a conduit 50 leading to a collection bin 51 having an outlet line 52. A gate valve 53 in the outlet line 52 is intermittently opened for an intermittent removal of the pellets by gravity.

The apparatus is tilted or inclined at such an angle that any fines which pass through the screen 20 and fail to pass through the duct 36 slide down the upper surface of the plate 13 and into a tapered conduit 56 connected to a tube 57 leading to the discharge line 46. The lowered pressure in the air moving through the discharge duct 46 will cause any fines entering the tapered conduit 56 to be withdrawn through the tube 57 to be carried away through the discharge duct 46.

In operation, the collection of polymeric material, including pellets, fines and any snakeskins, is fed downwardly in a stream of air from the first nozzle 31 to impinge on the screen 20 above the converging duct 36. The airstream passes through the screen 20, carrying the fines with it. Because of the large cross-sectional area of the enclosure 11, the air velocity drops significantly in this enclosure and the fines fall out of the airstream to be withdrawn through the pipe 38. The air in the enclosure 11 flows upward through the second nozzle 43 and the screen 20 to remove any snakeskins and any remaining fines from the polymeric collection and carry them out of the apparatus through the discharge duct 46.

The pellets impinged on the screen 20 bounce and roll and are carried by the movement of the screen downward toward the outlet pipe 50 where the clean pellets fall into the container 51. Air passing upwardly through the screen from the nozzle 43 lifts any snakeskins and remaining fines and carries them away through the discharge duct 46, leaving only clean pellets to be collected. The nozzle 43 is shown positioned below the center of the screen. It should be understood that this nozzle may be positioned at or above the center of the screen.

During the separation cycle described above, both gate valves 39 and 53 are closed to insure that only air from the nozzle 31 flows through the apparatus and that no unwanted air flows into or out of the apparatus through pipes 38 and 52. When the bin 51 is filled to a desired level with clean pellets, the air supply to the nozzle 31 is briefly shut off and the gate valves 39 and 53 are briefly opened to allow the pellets and fines to discharge by gravity to empty the bin 51 and the enclosure 11, respectively. The valves 39 and 53 are then closed and the air supply to nozzle 31 is turned on to continue the separation operation.

We claim:

1. Apparatus for removing snakeskins and fines from pellets in a collection of polymeric material, comprising:
   a. a moving screen
   b. a first nozzle positioned to impinge a collection of polymeric material on the screen at a first location, said polymeric material including polymer pellets, snakeskins and fines, said polymeric material being impinged on the screen in a downwardly moving first stream of air in such a manner that said fines pass through the screen at said first location,
   c. a second nozzle positioned to direct a second stream of air upwardly through the screen at a second location for lifting and removing the snakeskins from the screen, and
   d. means adjacent to the screen for collecting said pellets.

2. The apparatus of claim 1 wherein the screen is inclined such that said pellets will migrate down the screen to the lower edge thereof, said collecting means being positioned at said lower edge.

3. The apparatus of claim 2 wherein the screen is circular and is positioned in a closed chamber having a wall positioned below the screen to separate the chamber into upper and lower compartments, said wall having a first opening therein in alignment with the first nozzle, said second nozzle being positioned in a second opening in said wall for directing a stream of air upward through the screen to lift and carry away snakeskins.

4. Apparatus for separating snakeskins and fines from pellets in a collection of polymeric material comprising:
   a. an enclosure having a cover attached thereto to form a closed chamber, b. a plate positioned between the enclosure and the cover for dividing the chamber into upper and lower compartments, c. a rotating screen mounted above the plate, d. a first nozzle positioned in the upper compartment to direct a collection of polymeric material in a first stream of air downwardly onto the screen at a first location thereon, said collection of polymeric material including polymer pellets, fines and snakeskins, said plate having an opening under the first nozzle to allow said first stream of air to flow into the lower compartment, the screen being such that said screen will pass air and said fines and retain said pellets and snakeskins, e. a second nozzle mounted in the plate at a second location relative to the screen for directing a second stream of air upwardly through the screen to lift and remove snakeskins, f. a discharge duct positioned above the second nozzle and extending through the cover for carrying away said snakeskins, and g. an outlet conduit extending to an edge of the screen for receiving cleaned pellets.

5. The apparatus of claim 4 wherein the screen is inclined such that said pellets will bounce and roll down said rotating screen, said conduit being positioned at the lower edge of the screen.

6. The apparatus of claim 5 wherein a baffle secured to the cover extends downwardly toward the screen to prevent pellets from rolling down the screen countercurrent to screen movement.

7. The apparatus of claim 6 wherein the plate is provided with a tapered duct at the lower edge thereof, said duct being connected by a pipe to the discharge duct for removing fines which slide down said plate.

8. The apparatus of claim 7 wherein the first nozzle is positioned at a location between the center of the screen and the upper edge of the screen, said second nozzle having a rectangular cross-sectional configuration, said second nozzle being positioned at a location below the center of the screen, said second nozzle extending from a position below said center to a position adjacent to the edge of the screen, said second nozzle being so positioned that the pellets on the screen pass said second nozzle prior to reaching the outlet conduit.

9. The apparatus of claim 8 wherein a flange secured to the cover extends over the edge of the screen to prevent pellets from passing between the cover and the edge of the screen.

10. The apparatus of claim 9 wherein the screen and the wall are inclined at an angle of about 30°–40° to horizontal and the plate is provided with a frustoconical converging duct in alignment with said first nozzle and leading into said lower compartment.

* * * * *